United States Patent
Higano et al.

(10) Patent No.: US 11,365,129 B2
(45) Date of Patent: *Jun. 21, 2022

(54) METHOD FOR PRODUCING METAL OXIDE PARTICLES, METHOD FOR PRODUCING DISPERSION OF METAL OXIDE PARTICLES, AND METHOD FOR PRODUCING INFRARED SHIELDING FILM

(71) Applicant: MITSUBISHI MATERIALS CORPORATION, Tokyo (JP)

(72) Inventors: Satoko Higano, Naka (JP); Kazuhiko Yamasaki, Tokyo (JP)

(73) Assignee: MITSUBISHI MATERIALS CORPORATION, Tokyo (JP)

( * ) Notice: Subject to any disclaimer, the term of this patent is extended or adjusted under 35 U.S.C. 154(b) by 324 days.

This patent is subject to a terminal disclaimer.

(21) Appl. No.: 16/482,804

(22) PCT Filed: Jan. 26, 2018

(86) PCT No.: PCT/JP2018/002448
§ 371 (c)(1),
(2) Date: Aug. 1, 2019

(87) PCT Pub. No.: WO2018/143076
PCT Pub. Date: Aug. 9, 2018

(65) Prior Publication Data
US 2021/0276881 A1    Sep. 9, 2021

(30) Foreign Application Priority Data

Feb. 6, 2017 (JP) ............................. JP2017-019315

(51) Int. Cl.
*C01G 30/00* (2006.01)
*C01G 30/02* (2006.01)
*C01G 19/00* (2006.01)
*G02B 5/20* (2006.01)

(52) U.S. Cl.
CPC ........... *C01G 30/02* (2013.01); *C01G 19/006* (2013.01); *G02B 5/208* (2013.01); *C01P 2002/01* (2013.01); *C01P 2004/64* (2013.01)

(58) Field of Classification Search
CPC .... C01G 30/02; C01G 30/026; C01G 30/005; C01G 19/006; C01G 19/02; C01G 9/02; C01G 15/00; C01G 15/006; G02B 5/008; C01P 2002/01; C01P 2004/64
See application file for complete search history.

(56) References Cited

U.S. PATENT DOCUMENTS

| | | |
|---|---|---|
| 5,993,861 A | 11/1999 | Fogel |
| 2004/0192951 A1 | 9/2004 | Sawada et al. |
| 2006/0211152 A1 | 9/2006 | Peng et al. |
| 2015/0160379 A1 | 6/2015 | Shen et al. |
| 2015/0291501 A1 | 10/2015 | Yang et al. |
| 2016/0317992 A1 | 11/2016 | Thuo et al. |

FOREIGN PATENT DOCUMENTS

| | | |
|---|---|---|
| CN | 1872917 A | 12/2006 |
| CN | 101962516 A | 2/2011 |
| CN | 102251285 A | 11/2011 |
| CN | 102470090 A | 5/2012 |
| CN | 102498169 A | 6/2012 |
| CN | 102791870 A | 11/2012 |
| CN | 104725900 A | 6/2015 |
| CN | 107162044 A | 9/2017 |
| EP | 3578515 A1 | 12/2019 |
| JP | H05-070717 A | 3/1993 |
| JP | H07-109119 A | 4/1995 |
| JP | H08-041441 A | 2/1996 |
| JP | 10-265718 A | 10/1998 |
| JP | 2002-015631 A | 1/2002 |
| JP | 2004-300539 A | 10/2004 |
| JP | 2005-154654 A | 6/2005 |
| JP | 2007-145712 A | 6/2007 |
| JP | 2008-074911 A | 4/2008 |
| JP | 2008-521591 A | 6/2008 |
| JP | 2008-266050 A | 11/2008 |
| JP | 2008-297414 A | 12/2008 |
| JP | 2010-240520 A | 10/2010 |

(Continued)

OTHER PUBLICATIONS

Office Action dated Dec. 29, 2020, issued for Taiwanese Patent Application No. 107103555 and English translation thereof.
Notice of Allowance dated Apr. 12, 2021, issued for Korean Patent Application No. 10-2019-7019650 and English translation thereof.
Shaojuan Luo et al., "Effect of fatty acid on the formation of ITO nanocrystals via one-pot pyrolysis reaction", CrystEngComm, vol. 17, No. 5, 2015, pp. 1168-1172. (cited in the Nov. 23, 2020 Search Report issued for EP18747384.8).
Notice of Allowance dated Jul. 7, 2020, issued for Japanese Patent Application No. 2017-019315 and English translation thereof.

(Continued)

*Primary Examiner* — Steven J Bos
(74) *Attorney, Agent, or Firm* — Locke Lord LLP

(57) ABSTRACT

Production method for metal oxide fine particles includes: a step of mixing a fatty acid represented by $C_nH_{2n}O_2$ (n=5 to 14) and a metal source consisting of a metal, metal oxide, or metal hydroxide of at least two metal elements selected from the group consisting of Zn, In, Sn, and Sb to obtain a mixture; a step of heating the mixture at a temperature that is equal to or higher than a melting temperature of the fatty acid and lower than a decomposition temperature of the fatty acid to obtain a metal soap which is a precursor of metal oxide fine particles; and a step of heating the precursor at a temperature that is equal to or higher than a melting temperature of the precursor and lower than a decomposition temperature of the precursor to obtain metal oxide fine particles having an average particle diameter of 80 nm or less.

6 Claims, No Drawings

(56) References Cited

FOREIGN PATENT DOCUMENTS

| | | |
|---|---|---|
| JP | 2012-176859 A | 9/2012 |
| JP | 2013-001954 A | 1/2013 |
| JP | 2013-089533 A | 5/2013 |
| JP | 2013-216858 A | 10/2013 |
| JP | 2014-145050 A | 8/2014 |
| JP | 2015-003940 A | 1/2015 |
| JP | 2015-003941 A | 1/2015 |
| JP | 2015-511575 A | 4/2015 |
| JP | 2016-118679 A | 6/2016 |
| JP | 2017-024932 A | 2/2017 |
| TW | 201336786 A | 9/2013 |
| WO | 2006/057467 A1 | 6/2006 |
| WO | 2006/098756 A2 | 9/2006 |
| WO | 2017/217459 A1 | 12/2017 |
| WO | 2018/143076 A1 | 8/2018 |

OTHER PUBLICATIONS

Supplementary European Search Report dated Nov. 23, 2020, issued for European Patent Application No. 18747384.8.

Shaojuan Luo, et al., "Synthesis and application of non-agglomerated ITO nanocrystals via pyrolysis of indium-tin stearate without using additional organic solvents", Journal of Nanoparticle Research, vol. 16(8), 2014, 2561, pp. 1 to 12. (discussed in the spec).

International Search Report dated Mar. 6, 2018, issued for PCT/JP2018/002448 and English translation thereof.

Shaojuan Luo et al., "Synthesis and application of non-agglomerated ITO nanocrystals via pyrolysis of indium-tin stearate without using additional organic solvents," J Nanopart Res vol. 16(8) 2014, 2561 pp. 1-12.

International Search Report dated Mar. 19, 2019, issued for PCT/JP2019/004426 and English translation thereof.

International Search Report dated Jun. 18, 2019, issued for PCT/JP2019/011114 and English translation thereof.

Office Action dated Nov. 2, 2021, issued for Japanese Patent Application No. 2018-053819 and English translation thereof.

Notice of Allowance dated Jul. 20, 2021, issued for Japanese Patent Application No. 2018-023647 and English translation thereof.

Matsui Hiroaki et al., "Infrared Solar Thermal-Shielding Applications Based on Oxide Semiconductor Plasmonics", Nanoplasmonics—Fundamentals and Applications, Chapter 8, IntechOpen, Jun. 21, 2017, pp. 173-193 and cover page, (cited in the Nov. 26, 2021 Search Report issued for EP19770894.4).

Supplementary European Search Report dated Nov. 26, 2021, issued for European Patent Application No. 19770894.4.

Supplementary European Search Report dated Oct. 20, 2021, issued for European Patent Application No. 19753901.8.

Office Action dated Mar. 2, 2022, issued for U.S. Appl. No. 16/771,831.

Qianqian Dou et al., "Synthesis of various metal stearates and the corresponding monodisperse metal oxide nanoparticles", Powder X Technology, 2016, pp. 949-958. (cited in the Mar. 1, 2022 Office Action issued for CN201980007579.5).

Office Action dated Mar. 1, 2022, issued for Chinese Patent Application No. 201980007579.5 and English translation of the Search Report.

Office Action dated Mar. 31, 2022, issued for Taiwanese Patent Application No. 108109506 and English trnaslation of the Search Report.

METHOD FOR PRODUCING METAL OXIDE PARTICLES, METHOD FOR PRODUCING DISPERSION OF METAL OXIDE PARTICLES, AND METHOD FOR PRODUCING INFRARED SHIELDING FILM

TECHNICAL FIELD

The present invention relates to a method for producing metal oxide fine particles (metal oxide particles) using a fatty acid and a plurality of metals as starting materials. More specifically, the present invention relates to a method for producing metal oxide fine particles (metal oxide particles) suitable as a material for forming an infrared shielding film.

The present application claims priority on Japanese Patent Application No. 2017-019315 filed on Feb. 6, 2017, the content of which is incorporated herein by reference.

BACKGROUND ART

Conventionally, an indium tin stearate compound as a precursor of indium tin oxide (ITO) fine particles has been synthesized by directly reacting a stearic acid as a kind of fatty acid, metallic indium, and metallic tin at 260° C. for 3 hours under a nitrogen atmosphere. It has been reported that, by thermally decomposing the precursor, ITO fine particles having a particle diameter of 7 nm or less without aggregation are obtained without addition of an organic solvent (for example, see Non-Patent Document 1).

A method for producing ITO particles coated with an organic protective material using a hot soap method has been disclosed (for example, see Patent Document 1). In this method, fatty acid salts of indium and tin are used as raw materials. These fatty acid salts are dissolved in an organic solvent. Then, the organic solvent is evaporated, and the mixture of the fatty acid salts of indium and tin are thermally decomposed at a temperature of 200° C. to 500° C. Thereby, ITO particles coated with an organic protective material are formed. Patent Document 1 describes that the interval between the ITO particles can be changed by changing the number of carbon atoms of the fatty acid used in the above-described method, and the number of carbon atoms is preferably 4 to 30.

A stearic acid used in Non-Patent Document 1 is thought to modify surfaces of the obtained ITO fine particles and to act as a protective group. Since the stearic acid is a relatively long-chain fatty acid having 18 carbon atoms, the interval between the ITO fine particles covered with the stearic acid as a protective group tends to be wide. Therefore, in the case where an infrared shielding film is produced using these ITO fine particles, the infrared shielding effect is not sufficient.

The method in which fatty acid salts of indium and tin are used as raw materials shown in Patent Document 1 is not a direct method in which a fatty acid and a metal source consisting of a metal, metal oxide, or metal hydroxide are mixed and heated. Therefore, sodium or potassium remains as impurities in the organic protective material which covers ITO particles obtained by the method. In the case where a dispersion of the ITO particles is provided, such impurities affect the long-term stability of the dispersion.

PRIOR ART DOCUMENTS

Patent Document

Patent Document 1: Japanese Unexamined Patent Application, First Publication No. 2016-118679 (paragraph [0037])

Non-Patent Document

Non-Patent Document 1: Shaojuan Luo, et al., "Synthesis and application of non-agglomerated ITO nanocrystals via pyrolysis of indium-tin stearate without using additional organic solvents", Journal of Nanoparticle Research, Vol. 16(8), 2014, 2561, pp. 1 to 12

DISCLOSURE OF THE INVENTION

Problems to be Solved by the Invention

An object of the invention is to provide a method for producing metal oxide fine particles, a method for producing a dispersion (dispersion liquid) of the metal oxide fine particles, and a method for producing an infrared shielding film, and in the case where a dispersion of the metal oxide fine particles (hereinafter, also referred to as a dispersion) is provided, excellent long-term stability is exhibited, and in the case where the dispersion is applied for film formation, a film having high infrared shielding performance is obtained.

Solutions for Solving the Problems

According to a first aspect of the invention, there is provided a method for producing metal oxide fine particles, including: a step of mixing a fatty acid represented by $C_nH_{2n}O_2$ (n=5 to 14) and a metal source consisting of a metal, metal oxide, or metal hydroxide of at least two metal elements selected from the group consisting of Zn, In, Sn, and Sb to obtain a mixture; a step of heating the mixture at a temperature that is equal to or higher than a melting temperature of the fatty acid and lower than a decomposition temperature of the fatty acid to obtain a metal soap which is a precursor of metal oxide fine particles; and a step of heating the precursor at a temperature that is equal to or higher than a melting temperature of the precursor and lower than a decomposition temperature of the precursor to obtain metal oxide fine particles having an average particle diameter of 80 nm or less.

In the method for producing metal oxide fine particles according to a second aspect of the invention, the heating temperature for the mixture is set to be in a range of 130° C. to 250° C., and the heating temperature for the precursor is set to be in a range of 200° C. to 350° C. in the first aspect.

According to a third aspect of the invention, there is provided a method for producing a dispersion of metal oxide fine particles, including: a step of mixing the metal oxide fine particles produced by the method according to the first aspect or the second aspect and a hydrophobic solvent to obtain a dispersion of the metal oxide fine particles.

According to a fourth aspect of the invention, there is provided a method for producing an infrared shielding film, including: a step of applying the dispersion of the metal oxide fine particles produced by the method according to the third aspect to a substrate to obtain an infrared shielding film.

Effects of the Invention

The method for producing metal oxide fine particles according to the first aspect of the invention includes: a step of mixing a fatty acid represented by $C_nH_{2n}O_2$ (n=5 to 14) and a metal source consisting of a metal, metal oxide, or metal hydroxide of at least two metal elements selected from the group consisting of Zn, In, Sn, and Sb to obtain a mixture; a step of heating the mixture at a temperature that is equal to or higher than a melting temperature of the fatty acid and lower than a decomposition temperature of the fatty acid to synthesize a metal soap which is a precursor of metal oxide fine particles; and a step of heating the precursor at a temperature that is equal to or higher than a melting temperature of the precursor and lower than a decomposition temperature of the precursor to obtain metal oxide fine particles having an average particle diameter of 80 nm or less.

The metal source contains no sodium or potassium unlike in the method shown in Patent Document 1. Therefore, metal oxide fine particles having few impurities are obtained. The fatty acid in the metal soap which is a precursor modifies the surface of the produced metal oxide fine particles, and acts as a protective group for the metal oxide fine particles. Since the fatty acid is a fatty acid represented by $C_nH_{2n}O_2$ (n=5 to 14), it has a relatively short chain length. Therefore, the metal oxide fine particles are arranged in a state in which the distance between the metal oxide fine particles (interparticle distance) is short. Due to the surface plasmon effect exhibited thereby, the reflection in an infrared wavelength range is further enhanced.

In the method for producing metal oxide fine particles according to the second aspect of the invention, the heating temperature for the mixture is set to be in a range of 130° C. to 250° C., and the heating temperature for the precursor is set to be in a range of 200° C. to 350° C. Due to these heating conditions, the fatty acid and the precursor are not decomposed, and metal oxide fine particles modified with an organic protective group can be produced.

In the method for producing a dispersion of metal oxide fine particles according to the third aspect of the invention, the metal oxide fine particles produced by the method according to the first aspect or the second aspect are used. The metal oxide fine particles to be dispersed include an organic component on surfaces thereof together with a metal oxide. Therefore, a dispersion of the produced metal oxide fine particles is excellent in dispersion stability of the metal oxide fine particles, and the metal oxide fine particles are stably dispersed for a long period of time.

In an infrared shielding film formed by the method according to the fourth aspect of the invention, since surfaces of the metal oxide fine particles in the film are modified with a fatty acid represented by $C_nH_{2n}O_2$ (n=5 to 14) having a relatively short chain length, the metal oxide fine particles are arranged in a state in which the distance between the metal oxide fine particles (interparticle distance) is short. Therefore, the reflection in an infrared wavelength range is enhanced due to the surface plasmon effect, and thus the infrared shielding film has high infrared shielding performance.

EMBODIMENTS FOR CARRYING OUT THE INVENTION

Next, embodiments for carrying out the invention will be described.

[Fatty Acid as Starting Material]

A fatty acid according to this embodiment is a fatty acid represented by $C_nH_{2n}O_2$ (n=5 to 14). Specific examples thereof include a pentanoic acid (n=5), a hexanoic acid (n=6), a 4-methylpentanoic acid (n=6), a heptanoic acid (n=7), an octanoic acid (n=8), an octylic acid (n=8), a nonanoic acid (n=9), a decanoic acid (n=10), a dodecanoic acid (n=12), and a tetradecanoic acid (n=14). In the case where n denoting the number of carbon atoms is 4 or less, the finally obtained metal oxide fine particles exhibit poor dispersion stability in the case where a dispersion of the metal oxide fine particles is provided. In the case where n denoting the number of carbon atoms is 15 or greater, metal oxide fine particles modified with a fatty acid having 15 or more carbon atoms as a protective group have a wide particle interval therebetween. In the case where an infrared shielding film is produced using these fine particles, the infrared shielding effect is poor. The number of carbon atoms (n) is preferably 6 to 10.

[Metal Source as Starting Material]

A metal source according to this embodiment is a metal, metal oxide, or metal hydroxide. As will be described later, the metal source is required to be mixed and reacted with the fatty acid to form a metal soap. Accordingly, metal elements (metal elements included in the metal, metal oxide, or metal hydroxide) constituting the metal, metal oxide, or metal hydroxide are at least two selected from the group consisting of Zn, In, Sn, and Sb. The metal source is also a metal, metal oxide or metal hydroxide of at least two metal elements selected from the group consisting of Zn, In, Sn, and Sb. Accordingly, the metal source does not contain sodium and potassium. In order to form a film having high infrared shielding performance, the above-described metal, metal oxide, or metal hydroxide is required to include a plurality of, that is, at least two different metal elements. Preferably, two different metal elements are included. For example, in the case of two metal elements In and Sn, these are used at a mass ratio of In:Sn of 80 to 95:20 to 5. In the case of two metal elements Sb and Sn, these are used at a mass ratio of Sb:Sn of 85 to 98:15 to 2. In the case of two metal elements Zn and Sb, these are used at a mass ratio of Zn:Sb of 85 to 98:15 to 2. For example, in the case where the metal source is a metal of two metal elements In and Sn, the metal source is a mixture of an In metal powder and a Sn metal powder, an In—Sn alloy powder, or a mixture of two or more selected from the In metal powder, the Sn metal powder, and the In—Sn alloy powder.

[Synthesis of Precursor]

The fatty acid and the metal source are mixed to obtain a mixture, and the mixture is heated. Thus, a precursor of metal oxide fine particles which are final products is synthesized.

In mixing the fatty acid and the metal source, it is preferable that the metal source is added to the fatty acid which is in a molten state, and these are stirred for mixing.

Regarding the mixing ratio, the metal source is added in such an amount that the ratio of the metal components (metal elements) in the metal source is 5 to 40 mass %, and preferably 10 to 30 mass % with respect to 100 mass % of the fatty acid. In the case where the amount of the metal components (metal elements) is less than 5 mass %, a problem occurs in which many unreacted fatty acids remain. In the case where the amount of the metal components (metal elements) is greater than 40 mass %, a problem occurs in which metal components (metal elements) not contributing to the reaction are generated as a by-product.

The mixture of the fatty acid and the metal source is heated at a temperature that is equal to or higher than a melting temperature of the fatty acid and lower than a decomposition temperature of the fatty acid, and is held at the above-described temperature for 1 to 5 hours. In the case where the metal source is a metal, the mixture is heated under an atmosphere of an inert gas such as nitrogen or an argon gas. In the case where the metal source is a material other than a metal, the mixture is heated under an atmosphere of an inert gas such as nitrogen or an argon gas or an air atmosphere. Specifically, the heating temperature is 130° C. to 250° C., and preferably 150° C. to 230° C. In the case where the heating temperature is lower than 130° C., the fluidity of the fatty acid is insufficient, and the fatty acid does not melt. Thus, the fatty acid and the metal source are not sufficiently mixed. In the case where the heating temperature is higher than 250° C., the fatty acid is decomposed, and a metal soap which is a precursor is not synthesized. The heating time (heating holding time) can be appropriately changed within the above-described range according to the type of the metal source, the mixing ratio with the fatty acid, and the like. Through the heating, a metal soap which is a precursor of metal oxide fine particles that are final products is synthesized.

[Production of Metal Oxide Fine Particles]

The obtained precursor is held at a temperature that is equal to or higher than a melting temperature of the precursor and lower than a decomposition temperature of the precursor for 0.5 to 8 hours. Specifically, the heating temperature is 200° C. to 350° C., and preferably 230° C. to 310° C. In the case where the heating temperature is lower than 200° C., the precursor does not melt, particles are not formed, and thus metal oxide fine particles are not produced. In the case where the heating temperature is higher than 350° C., a problem occurs in which the fatty acid is decomposed and carbonized simultaneously with the decomposition of the precursor, and thus metal oxide fine particles cannot be produced. The heating time (heating holding time) can be appropriately changed within the above-described range according to the type of the precursor, the type of the metal source, and the like.

Through the heating, metal oxide fine particles which are the final products are obtained. The metal oxide fine particles have an average particle diameter of 80 nm or less, preferably 5 to 50 nm, and the particle surface is modified with an organic protective group. Examples of the metal oxide fine particles according to this embodiment include an indium tin oxide (ITO: Indium doped Tin Oxide), an antimony tin oxide (ATO:Antimony doped Tin Oxide), and an antimony zinc oxide (AZO: Antimony doped Zinc Oxide).

The average particle diameter is measured by the following method. The metal oxide fine particles are imaged (photographed) at a magnification of 100,000 using a transmission electron microscope (model name: JEM-2010F, manufactured by JEOL Ltd.). The captured image is subjected to image analysis by software (trade name: Image J), and particle diameters of 300 particles are measured. The average value of the obtained particle diameters is calculated to obtain the average particle diameter.

A method in which as in this embodiment, a fatty acid and a metal source consisting of a metal, metal oxide, or metal hydroxide are mixed and heated to obtain a metal soap which is a precursor of metal oxide fine particles is referred to as a direct method.

In this embodiment, a metal soap is produced by the direct method, and the metal soap is heated to obtain metal oxide fine particles. The metal soap is a precursor of metal oxide fine particles.

[Production of Dispersion of Metal Oxide Fine Particles]

The obtained metal oxide fine particles are added to a hydrophobic solvent, and stirred to be mixed, whereby a dispersion in which the metal oxide fine particles are dispersed is produced. Examples of the hydrophobic solvent include toluene, hexane, and kerosene. The metal oxide fine particles contain a metal oxide, and a surface of the metal oxide is modified with a hydrocarbon group derived from a fatty acid. Therefore, the metal oxide fine particles are stably dispersed in the hydrophobic solvent. The metal oxide fine particles are preferably added and mixed in an amount of 5 to 60 mass % with respect to 100 mass % of the hydrophobic solvent according to a dispersion application method.

[Formation of Infrared Shielding Film]

The obtained dispersion is applied to, for example, a surface of a transparent glass substrate or a resin film which is a substrate. Next, the coated film is dried at a predetermined temperature, and then heat-treated. Thereby, an infrared shielding film having a thickness of 0.1 to 2.0 µm, preferably 0.2 to 1.5 µm, is formed on the surface of the glass substrate or the resin film.

In the case where the substrate is a transparent glass substrate, the heat treatment is conducted by holding the coated film at a temperature of 50° C. to 300° C. for 5 to 60 minutes under an oxidizing atmosphere. The temperature and the holding time are determined according to adhesion strength required for the film.

In the case where the substrate is a transparent resin film, the heat treatment is conducted by holding the coated film at a temperature of 40° C. to 120° C. for 5 to 120 minutes under an oxidizing atmosphere. The temperature and the holding time are determined according to the adhesion strength required for the film and the heat resistance of the base film.

EXAMPLES

Next, examples of the invention will be described in detail together with comparative examples.

Example 1

A decanoic acid was prepared as a fatty acid. Metallic indium and metallic tin as a metal source were weighed such that a mass ratio of the metal components (metal elements) was indium:tin=90:10. The fatty acid and the metal source were added and mixed. The metal source was added at a ratio of 25 mass % with respect to the fatty acid in terms of metal components. That is, the metal source was added in such an amount that the amount of the metal components (metal elements) was 25 mass % with respect to 100 mass % of the fatty acid.

The obtained mixture was heated to 230° C. in a nitrogen atmosphere, and held for 3 hours while being stirred. Thereafter, the mixture was heated to 260° C., and further held for 3 hours while being stirred. Through the heating, particles in which surfaces of ITO fine particles were modified with an organic protective group were obtained. The particles were cooled to room temperature, and ITO fine particles having an average particle diameter of 10 nm were produced.

Examples 2 to 11 and Comparative Examples 1 to 3

Metal oxide fine particles having an average particle diameter shown in Table 1 were produced in the same manner as in Example 1, except that the types shown in Table 1 were selected as fatty acids and metal sources that were starting materials of Examples 2 to 11 and Comparative Examples 1 to 3, and heating was performed at the heating temperatures shown in Table 1.

The mass ratios of the metal sources in Table 1 are mass ratios of metal components (metal elements) in the case where a total amount of the metal components (metal elements) is 100%.

Comparative Example 4

An octylic acid as a raw material of a fatty acid was heated to 45° C., and an aqueous solution of sodium hydroxide was added thereto and stirred to obtain an aqueous solution of sodium octylate. To the aqueous solution of sodium octylate, an aqueous solution of indium chloride was added as a raw material of a metal source and stirred to obtain indium octylate. Similarly, to the aqueous solution of sodium octylate, an aqueous solution of tin chloride was added as a raw material of a metal source to obtain tin octylate. The obtained indium octylate and tin octylate were weighed and mixed such that a mass ratio of the metal components (metal elements) was indium:tin=9:1, and the mixture was dissolved in toluene. The toluene solution was dried under reduced pressure, and then heated at 350° C. for 3 hours to produce metal oxide fine particles having an average particle diameter shown in Table 1.

Table 1 to be described later shows fatty acids and metal sources which are raw materials of the direct method. Since the producing method of Comparative Example 4 is not a direct method, the raw material corresponding to the metal source of Table 1 is not used in Comparative Example 4. Therefore, in Table 1, the item of the metal source of Comparative Example 4 is described as "–".

The 15 types of metal oxide fine particles obtained in Examples 1 to 11 and Comparative Examples 1 to 4 were washed with ethanol and acetone, and dried at 50° C. Next, 5 g of the fine particles of each type were added to 20 g of toluene and dispersed using an ultrasonic homogenizer to obtain a dispersion of the metal oxide fine particles.

<Comparison Test and Evaluation>

Each of the 15 types of dispersions obtained in Examples 1 to 11 and Comparative Examples 1 to 4 was spin-coated on a surface of a transparent soda-lime glass substrate having a square shape of 50 mm×50 mm and a thickness of 0.7 mm for 60 seconds at a rotation speed of 500 rpm to form a coated film. Next, an epoxy resin coating agent (product name: GLASSCA, manufactured by JSR Corporation) was spin-coated on the coated film for 60 seconds at a rotation speed of 2,000 rpm. Next, the coated film was dried at 120° C. for 20 minutes under an air atmosphere to form 15 types of infrared shielding films including a 0.3 μm thick metal oxide particle-containing layer and a 2 μm thick overcoat layer. Regarding these infrared shielding films, the maximum infrared reflectance and the long-term stability of the dispersion were evaluated. The results thereof are shown in Table 1.

(1) Maximum Infrared Reflectance

Regarding the 15 types of infrared shielding films, the maximum reflectance in a wavelength range of 800 to 2,500 nm was measured using a spectrophotometer (product name: U-4100, manufactured by Hitachi High-Technologies Corporation).

(2) Long-Term Stability of Dispersion

Each of the 15 types of dispersions of metal oxide fine particles was sealed in a glass bottle, and left in an environment where the temperature was 25° C. and the relative humidity was 50%. The color of the dispersion was confirmed in a solution state after one month and after three months. A case where the color of the dispersion was uniform throughout and no clear liquid was confirmed in the supernatant until three months had elapsed was evaluated to be "excellent". A case where there was no change until one month had elapsed, but a clear liquid was confirmed in the supernatant of the dispersion at a time when three months had elapsed was evaluated to be "good". A case where a clear liquid was confirmed in the supernatant of the dispersion at a time when one month had elapsed was evaluated to be "poor".

TABLE 1

| | Fatty Acid | | Metal Source | | | | Metal Oxide Fine Particles | |
|---|---|---|---|---|---|---|---|---|
| | Type | Number of Carbon | Type | Mass Ratio | Type | Mass Ratio | Type | Average Particle Diameter (nm) |
| Example 1 | Decanoic Acid | 10 | Metallic In | 90 | Metallic Sn | 10 | ITO | 10 |
| Example 2 | Nonanoic Acid | 9 | In₂O₃ | 95 | SnO₂ | 5 | ITO | 20 |
| Example 3 | Hexanoic Acid | 6 | In Hydroxide | 90 | Sn Hydroxide | 10 | ITO | 25 |
| Example 4 | Tetradecanoic Acid | 14 | In₂O₃ | 90 | SnO₂ | 10 | ITO | 10 |
| Example 5 | Octanoic Acid | 8 | Metallic In | 80 | Metallic Sn | 20 | ITO | 40 |
| Example 6 | 4-Methylpentanoic Acid | 6 | In Hydroxide | 90 | Sn Hydroxide | 10 | ITO | 80 |
| Example 7 | Decanoic Acid | 10 | Metallic In | 95 | Metallic Sn | 5 | ITO | 30 |
| Example 8 | Heptanoic Acid | 7 | In₂O₃ | 93 | SnO₂ | 7 | ITO | 50 |
| Example 9 | Nonanoic Acid | 9 | Sn Hydroxide | 95 | Sb Hydroxide | 5 | ATO | 30 |
| Example 10 | Pentanoic Acid | 5 | Metallic In | 90 | Metallic Sn | 10 | ITO | 25 |
| Example 11 | Decanoic Acid | 10 | Zn Hydroxide | 95 | Metallic Sb | 5 | AZO | 30 |
| Comparative Example 1 | Stearic Acid | 18 | Metallic In | 90 | Metallic Sn | 10 | ITO | 30 |
| Comparative Example 2 | Heptadecanoic Acid | 16 | Metallic In | 90 | Metallic Sn | 10 | ITO | 20 |
| Comparative Example 3 | Propionic Acid | 3 | Metallic In | 90 | Metallic Sn | 10 | ITO | 35 |
| Comparative Example 4 | Octylic Acid | 8 | — | | | | ITO | 20 |

| | Heating Temperature for Mixture (° C.) | Heating Temperature for Precursor (° C.) | Maximum Infrared Reflectance (%) | Long-Term Stability of Dispersion |
|---|---|---|---|---|
| Example 1 | 230 | 260 | 55 | Excellent |
| Example 2 | 210 | 265 | 61 | Good |

TABLE 1-continued

| | | | | |
|---|---|---|---|---|
| Example 3 | 140 | 250 | 49 | Good |
| Example 4 | 250 | 290 | 57 | Excellent |
| Example 5 | 160 | 270 | 64 | Good |
| Example 6 | 150 | 250 | 51 | Good |
| Example 7 | 230 | 260 | 59 | Excellent |
| Example 8 | 150 | 255 | 60 | Good |
| Example 9 | 180 | 260 | 53 | Good |
| Example 10 | 130 | 200 | 51 | Good |
| Example 11 | 160 | 240 | 50 | Good |
| Comparative Example 1 | 240 | 310 | 41 | Excellent |
| Comparative Example 2 | 210 | 300 | 37 | Excellent |
| Comparative Example 3 | 130 | 200 | 45 | Poor |
| Comparative Example 4 | 45 | 350 | 56 | Poor |

As is obvious from Table 1, the long-term stability of the dispersion was "poor" in Comparative Example 3 in which the metal oxide fine particles were produced using the fatty acid having 3 carbon atoms. In Comparative Examples 1 and 2 produced using the fatty acid having 16 or 18 carbon atoms, the maximum infrared reflectances of the infrared shielding films were 41% and 37%, respectively, and the infrared shielding performance was poor. In Comparative example 4 produced using the fatty acid salts of indium and tin as raw materials, the long-term stability of the dispersion was "poor".

In contrast, in Examples 1 to 11 produced using the fatty acids having 5 to 14 carbon atoms, the maximum infrared reflectances of the infrared shielding films were 49% to 64%, and the infrared shielding performance was excellent. The long-term stability of the dispersion was also "good" or "excellent".

INDUSTRIAL APPLICABILITY

An infrared shielding film having high infrared shielding performance can be obtained by applying metal oxide fine particles produced by the method according to the invention to a transparent substrate such as a glass or a film. Therefore, the invention can be suitably applied to the process for manufacturing an infrared shielding film.

The invention claimed is:

1. A method for producing metal oxide fine particles, the method comprising:
a step of mixing a fatty acid represented by $C_nH_{2n}O_2$ (n=5 to 14) and a metal source consisting of a metal, metal oxide, or metal hydroxide of at least two metal elements selected from the group consisting of Zn, In, Sn, and Sb to obtain a mixture;
a step of heating the mixture at a temperature that is equal to or higher than the melting temperature of the fatty acid and lower than the decomposition temperature of the fatty acid to obtain a metal soap which is a precursor of metal oxide fine particles; and
a step of heating the precursor at a temperature that is equal to or higher than the melting temperature of the precursor and lower than the decomposition temperature of the precursor to obtain metal oxide fine particles having an average particle diameter of 80 nm or less.

2. The method for producing metal oxide fine particles according to claim 1, wherein the heating temperature for the mixture is set to be in a range of 130° C. to 250° C., and the heating temperature for the precursor is set to be in a range of 200° C. to 350° C.

3. A method for producing a dispersion of metal oxide fine particles, the method comprising:
a step of mixing the metal oxide fine particles produced by the method according to claim 1 and a hydrophobic solvent to obtain a dispersion of the metal oxide fine particles.

4. A method for producing an infrared shielding film, the method comprising:
a step of applying the dispersion of the metal oxide fine particles produced by the method according to claim 3 to a substrate to obtain an infrared shielding film.

5. A method for producing a dispersion of metal oxide fine particles, the method comprising:
a step of mixing the metal oxide fine particles produced by the method according to claim 2 and a hydrophobic solvent to obtain a dispersion of the metal oxide fine particles.

6. A method for producing an infrared shielding film, the method comprising:
a step of applying the dispersion of the metal oxide fine particles produced by the method according to claim 5 to a substrate to obtain an infrared shielding film.

* * * * *